Patented July 19, 1932

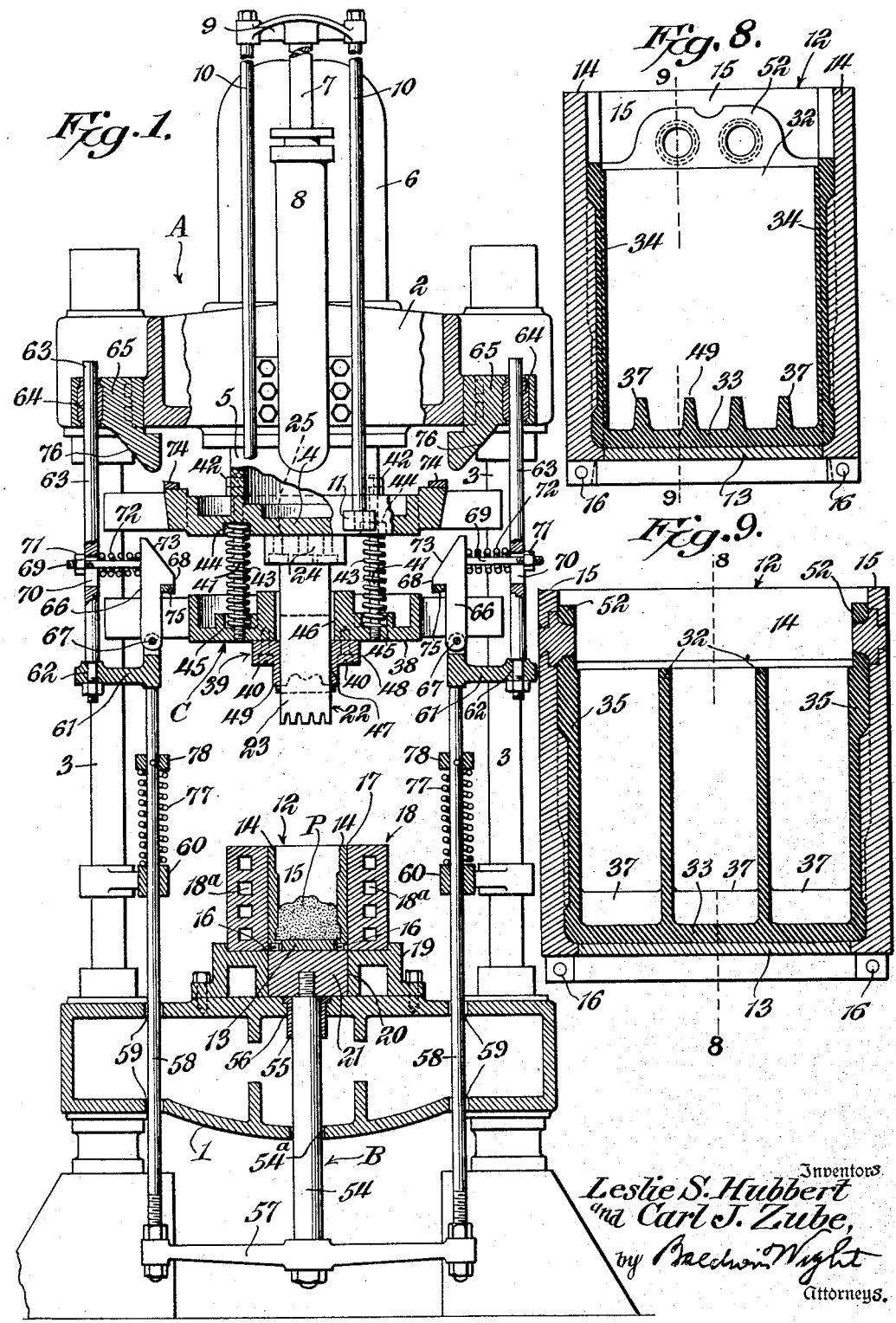

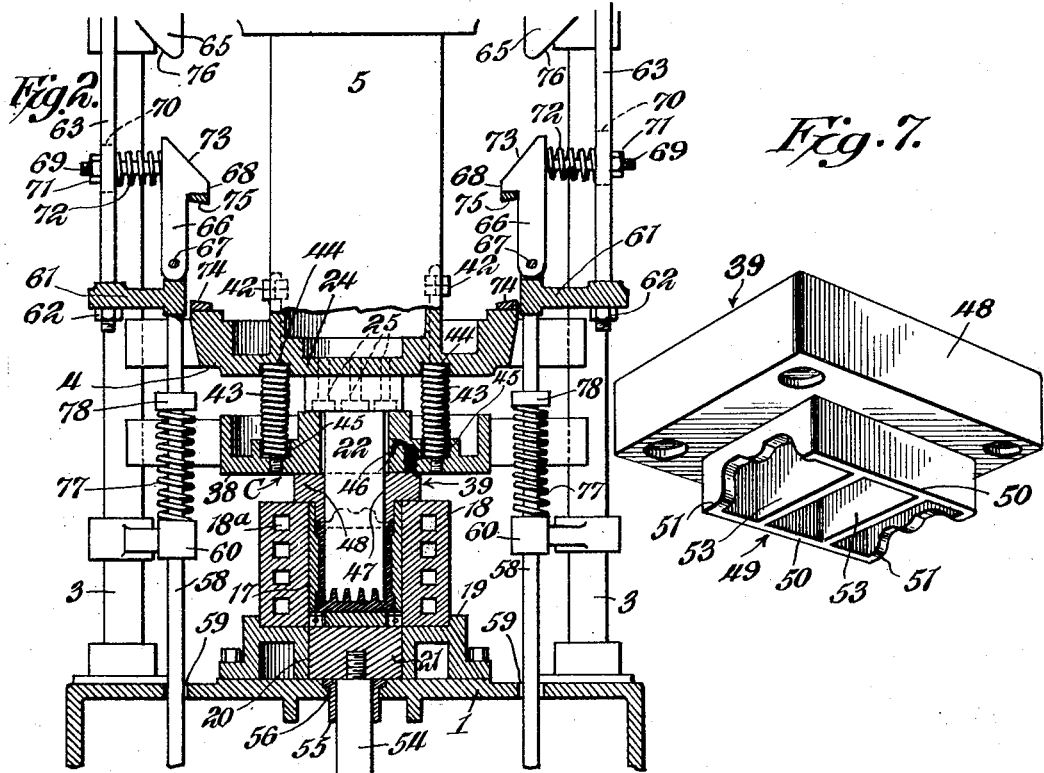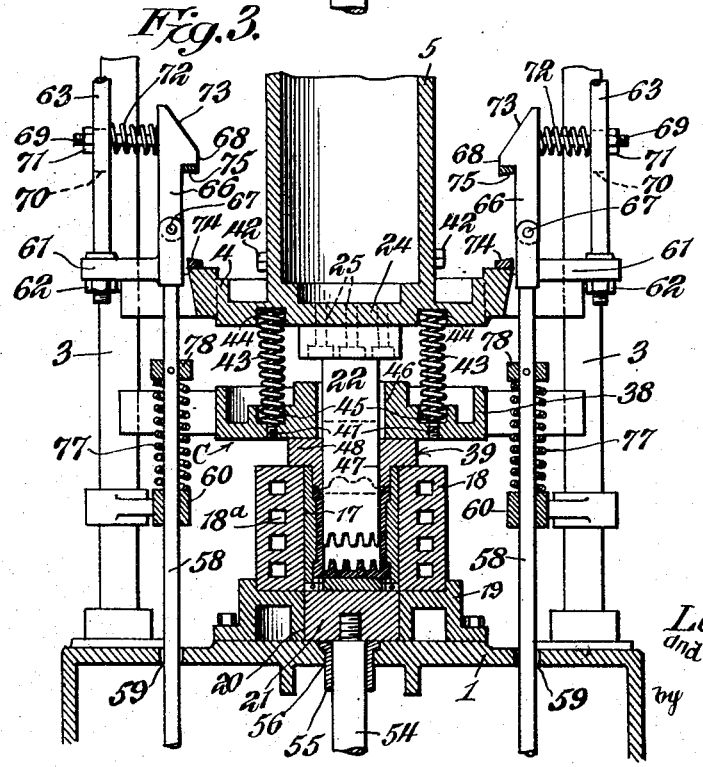

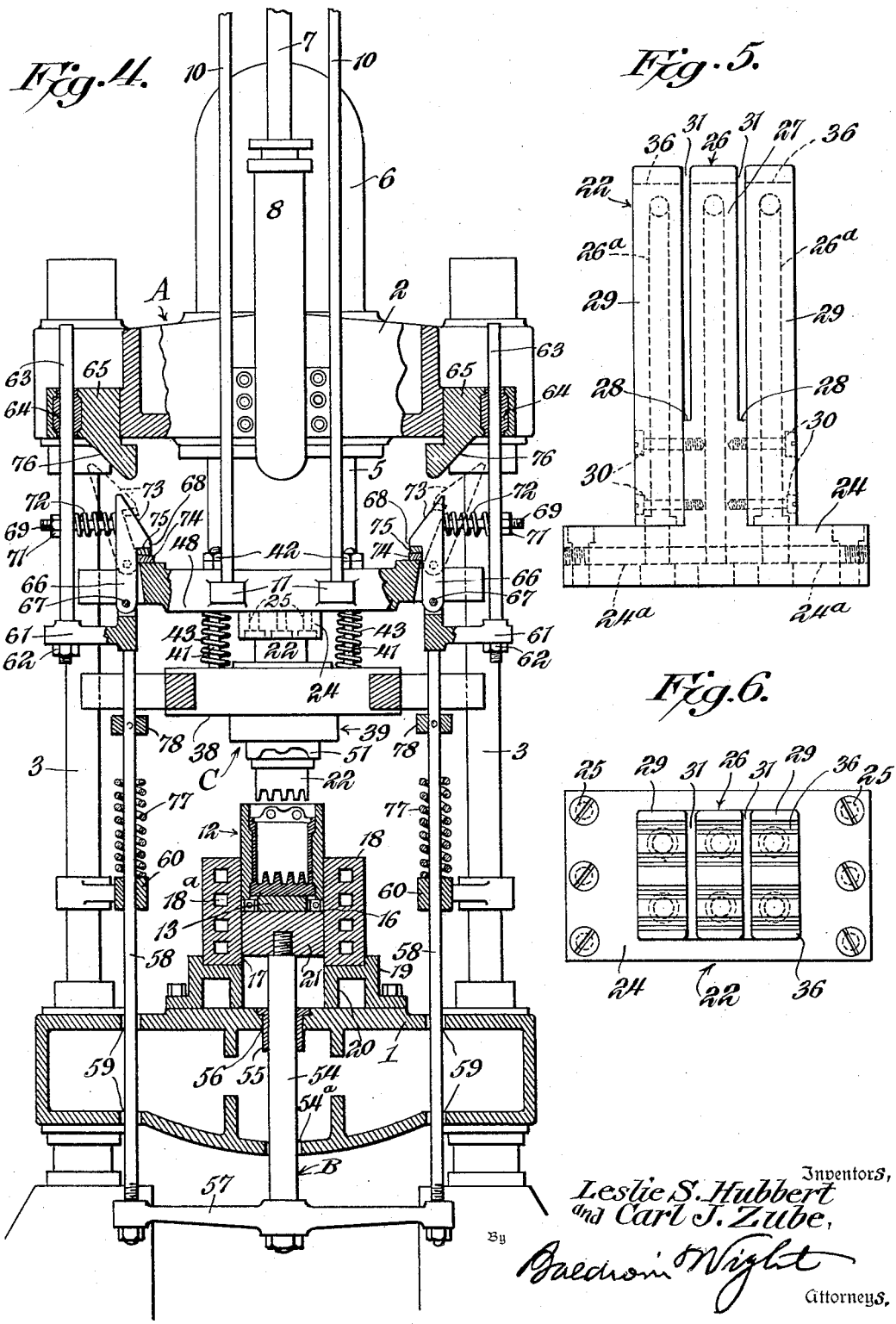

1,867,972

UNITED STATES PATENT OFFICE

LESLIE S. HUBBERT, OF MOUNT GILEAD, OHIO, AND CARL J. ZUBE, OF LOS ANGELES, CALIFORNIA, ASSIGNORS TO HYDRAULIC PRESS MANUFACTURING COMPANY, OF MOUNT GILEAD, OHIO

PRESS FOR MANUFACTURING MOLDED ARTICLES

Application filed June 8, 1931. Serial No. 542,978.

Our invention relates to improvements in methods of and presses for manufacturing molded articles from plastic material. More particularly the invention relates to an improved method of sealing a mold and subsequently stripping the formed article from a die arranged to cooperate with the mold, and in a novel press construction arranged to automatically carry out the several steps of the method as well as to efficiently perform other desirable operations.

In the manufacture of molded articles, such as battery boxes, it is usually desirable to employ a mold having a bottom and sides separable from the bottom or so hinged thereto as to swing outwardly from the formed article after the pressing operation has been performed, this arrangement being desirable because of the fact that irregularities in the design of the walls would, if the walls were not hinged or separable, prevent the removal of the molded article from the mold unless loose mold pieces are used, the latter practice being subject to disadvantages. When using a mold having hinged or otherwise separable sides, the sides are, during the pressing operation, maintained in position to conjointly define a mold cavity, by means of clamps or, in some cases, a mold box or receptacle in which the mold is bodily positioned. After the article is formed in the mold, the latter is unclamped or is removed from the mold receptacle, as the case may be, and the mold sides are then swung or moved outwardly to permit removal of the formed article.

One object of the present invention is to provide, in a molding press of the kind having a mold box or receptacle for receiving an article forming mold, a means for automatically removing or ejecting the mold from the mold box after the article has been formed.

Another object is to provide means for yieldably engaging and sealing a mold during a pressing operation and for retaining the formed article in the mold during the initial part of the die withdrawal stroke to thus loosen and strip the article from the die.

A further object is to provide a method of producing articles from plastic material in which the formed article is positively held in the mold during the initial part of the withdrawal of the die, thus effecting loosening of the article from the die, and subsequently removing the die completely from within the formed article and then the article from within the mold. Other objects will be apparent from a reading of the following description, the appended claims and the accompanying drawings, which illustrate a practical embodiment of the invention.

In the drawings:

Figure 1 is a front elevation of a press embodying the invention, certain parts being shown in section;

Figure 2 is a fragmentary view showing certain parts in front elevation and other parts in vertical section, the parts being in different relative positions from the positions shown in Figure 1;

Figure 3 is a view similar to Figure 2, the parts being shown in other relative positions;

Figure 4 is a view similar to Figure 1, the parts being shown in still other relative positions;

Figure 5 is a view in front elevation and on an enlarged scale of a die;

Figure 6 is a top plan view on an enlarged scale of the die;

Figure 7 is a perspective view of a die stripping and mold sealing ring;

Figure 8 is a vertical sectional view of a mold, taken on the line 8—8 of Figure 9, and drawn on an enlarged scale, and Figure 9 is a vertical sectional view of a mold, taken on the line 9—9 of Figure 8, and drawn on an enlarged scale.

The invention may be embodied in presses of various kinds but for the purposes of illustration is shown in the drawings as embodied in a hydraulic press A of the downward pressure type including a base 1, a press head 2 connected to the base by means of strain rods 3, and a main platen 4 mounted for sliding movements on the strain rods to perform pressing and return strokes respectively towards and away from the base 1. A main or pressing ram 5 integral with the main platen 4 is mounted for sliding movements in a fluid pressure cylinder 6 on the press head, this ram and cylinder cooperating to move the platen downwardly to perform pressing strokes. A pair of auxiliary or pull back rams 7, only one of which is shown, is provided for returning the platen to its upper position after a pressing stroke has been performed. Each ram 7 is mounted for sliding movements in an auxiliary cylinder 8 secured to the press head, and each ram is connected to the platen by means of a yoke 9 secured to the upper end of the ram, and rods 10—10 having their upper ends secured to the yoke and their lower ends secured respectively to lugs 11—11 on the platen.

A mold 12 having a bottom 13 and side and end walls 14—14 and 15—15 respectively, hinged as at 16 to the bottom 13, is removably positioned in a vertically extending opening 17 in a mold box 18 supported on the base 1 through the medium of a bed casting 19 secured to the base. The casting 19 is formed with an opening 20 which registers with the opening 17 in the mold box. The mold 12 is supported on the base 1 by means of an ejecting block 21 which forms part of a mold ejecting mechanism B to be later particularly described, the block 21 being normally positioned in the opening in the bed casting and normally resting upon the base of the press. When the mold is thus positioned in the opening 17, the sides of the mold are maintained in a "folded in" position to conjointly define a substantially rectangular mold cavity. It will be observed that the base 2, the bed casting 19 and the mold box 18 together constitute a mold support. The mold box 18 is formed with a passage 18$^a$ for the circulation of steam or hot water for heating the mold.

A die mold member generally designated 22 is arranged to cooperate with the mold for the forming of battery boxes or containers and includes a straight mold entering portion 23 and an enlarged base portion 24 which is secured to the platen by means of screws 25.

The mold and die illustrated are especially designed for the production of battery boxes having a plurality of cell chambers necessitating the provision of means for forming division walls in the battery box. These means are provided in the die 22 and will be most clearly understood by reference to Figures 5 and 6. Referring to these figures, it will be seen that the base portion 24 of the die has integrally formed therewith a central die section 26 provided with a reduced mold entering portion 27 forming resultant raised portions or pads 28—28 on the opposite sides of said central section. Separate end die sections 29—29 are secured to the section 26 by means of screws 30 which pass through the sections 29—29 and have threaded connection with the central section, thereby clamping the die sections 29—29 forcibly against the pads 28—28 and providing resultant spaces 31—31 between the central die section and the sections 29, these spaces providing for the formation of partition walls 32 in the formed container,—see Figures 8 and 9. The outside cross sectional dimensions of the assembled die and the inside dimensions of the mold are such as to leave a space between the die and the mold when the die enters the mold, to form a container having a bottom 33, sides 34—34 and ends 35—35. A series of depressions 36 in the bottom of each die section provides for the formation of ribs 37 in the bottom of the container. The die sections 26 and 29—29 are provided with passages 26$^a$ which communicate with passages 24$^a$ in the base portion 24, these latter passages being adapted to be connected to a source of cooling water. We have found that by circulating a cooling medium through the die during the pressing operation, setting of the plastic material is hastened and rapid production is thereby made possible.

It will be seen that the mold walls which define the outer contour of the article formed, are heated, thus imparting a high finish to the outside of the article, while the die is cooled during the pressing operation in order to set the plastic material quickly. It is apparent that the main platen 4 constitutes a movable support for the die mold member 22.

Disposed between the platen 4 and the mold support is a die stripping and mold sealing device C including a sub-platen 38 carried by the platen 4 and arranged for sliding movements on the strain rods 3, and a die stripping and mold sealing ring 39 secured to the sub-platen by means of screws 40. The sub-platen is connected to the platen 4 by means of a yieldable connection comprising a plurality of rods 41 having threaded connection in the sub-platen and extending through and arranged for sliding movements in openings in the platen 4, nuts 42 on the upper ends of the rods serving to limit the downward movement of the sub-platen with respect to the platen 4. Springs 43 through which the rods 41 extend and which are interposed between the main platen and the sub-platen have their ends seated in spring seats 44 and 45 in the platen and sub-platen respectively and serve to yieldably urge the sub-platen away from the platen and consequently to resist movement of the sub-platen towards the main platen.

The sub-platen is provided with an opening 46 through which the die 22 extends, the opening being sufficient to provide an appreciable clearance between the die and the walls of the opening, and the ring 39 is provided with an opening 47 coaxial with the opening 46 and through which the die 22 is adapted to be projected for cooperation with the mold 12. It will be noted that the die has a close sliding fit in the opening 47 in the sealing ring. From the foregoing it will be observed that the device C is arranged for limited movements towards and from the platen 4 in the direction of platen travel.

Referring now to Figure 7 it will be seen that the sealing ring 39 includes a base portion 48 and a downwardly extending mold entering portion 49 which is adapted to enter the space left between the die and the mold when the former is disposed in pressing position within the latter, and to seal the top of the mold, at the same time constituting that part of the mold which determines the height of the container being formed. This downwardly extending portion 49 includes side walls 50—50 and end walls 51—51, the latter being provided with depressions for forming upstanding handles 52—52 on the container formed, and with partition walls 53—53 which divide the opening 47 into three spaces through which the die sections 26 and 29—29 extend, these partition walls determining the height of the partition walls 32—32 in the container formed.

In operation the parts will be in the Figure 1 position before a pressing stroke begins. When it is desired to press and form a container, a charge of plastic material P is placed in the mold and the platen and associated die and a sealing device are caused to move downwardly. The lower portion of the die will first enter the mold but before any substantial contact of the die with the plastic material takes place, the mold entering portion 49 of the sealing ring 39 will enter the mold and the base 48 of the sealing ring will seat upon the top of the mold and the mold box 18, thus effectively sealing the space between the latter and the die. During continued downward movement of the platen the sealing device will be held stationary, thus compressing the springs 43, and the platen and die will continue to descend until the base 24 of the die engages the sub-platen, arresting further downward movement of the platen. The parts will then be in the relative positions shown in Figure 2 and the pressing operation will have been completed.

After the pressing operation has been completed it is desirable that the die be first withdrawn from the formed container and that the mold be then removed from the mold box 18 in order that the mold may be set aside to cool and that another mold be positioned in the mold box preparatory to the formation of another container. To this end we have provided a novel mold ejecting means B including the block 21 interposed between the mold and the base 2, and means for automatically projecting the block upwardly through the opening 17 in the mold box when the platen performs a return stroke. This means includes a rod 54 having threaded connection with the ejecting block 21 and extending downwardly through an opening 54$^a$ in the base 2 and through a bushing 55 mounted in an opening 56 in the base, a yoke 57 secured to the lower end of the rod 54, and a pair of pull rods 58 having their lower ends respectively secured to opposite ends of the yoke and extending upwardly through openings 59 in the base 2 and being mounted for sliding movements in guide bosses 60—60 mounted on the strain rods 3. Arms 61—61, respectively secured to the upper ends of the rods 58, extend outwardly for connection as at 62 with guide rods 63 and are mounted for sliding movements in bushings 64 secured in cam blocks 65 on the press head.

Latches 66 are respectively pivoted to the arms 61 as at 67, each latch having an inwardly directed nose 68. Bolts 69 respectively secured to the latches and extending outwardly through slots 70 in the adjacent guide rods 62 and provided at their outer ends with nuts 71, serve to limit the inward movement of the latches, and springs 72—72 interposed between the latches and the associated guide rods and through which the bolts extend urge the latches inwardly to the Figure 1 position. Each latch is formed with an inclined surface 73 engageable by the platen when the latter descends for swinging the latch outwardly against the urge of the associated spring 72. After the latches have been thus swung outwardly and the platen has passed below the latches, the latter will be returned to their Figure 1 position by means of the springs 72, in which position the noses of the latches are disposed above wear blocks 74—74 on the platen. Preferably the latches are provided with wear blocks 75—75 for engagement with the wear blocks on the platen when the latter reaches a predetermined point during its upward travel.

In operation, assuming the parts to be in the positions shown in Figure 2, at which time a pressing operation has been completed in the manner described above, the platen will be started on its return stroke under the control of the auxiliary rams 7. During the initial part of the return stroke the springs 43 of the die stripping and mold sealing device C will expand and will thereby maintain the ring 39 in the Fig. 2 position, but at this time the die will have started its upward movement with the platen, and the formed container will be held stationary by the stripping and sealing ring and will thus be loosened and stripped from the die as shown in Figure 3, which illustrates the relative positions of the various parts during the first part of a return stroke of the platen. When the platen proceeds farther on the return stroke, the nuts 42 on the rods 41 of the stripping and sealing device will be engaged by the platen, the platen then lifting the sub-platen and the ring 39 from the mold. Upon further movement of the platen, the wear blocks 74 on the platen will engage the wear blocks 75 on the latches, thus lifting the rods 58, the yoke 57, the rod 54, and the ejecting block 21, moving the latter and the mold 12 upwardly through the opening in the mold box as indicated in Figure 4. When the mold 12 has been ejected from the opening in the mold box 18, the mold will be removed from the press and set aside to cool, after which the side and end walls 14—14 and 15—15 are swung back about their hinges and the formed container may then be removed from the mold.

In order to provide for rapid operation of the press, means are provided for automatically effecting a return of the ejecting mechanism to its Figure 1 position as soon as the mold 12 has been removed from the mold box. This means comprises the cam blocks 74, each having an inclined cam surface 76 adapted to be engaged by the inclined surfaces 73 of the latches for swinging the latter outwardly and disengaging them from the platen when the platen has nearly reached the end of its return stroke. As shown in dotted lines in Figure 4, when the platen approaches the end of its return stroke, the latches will engage the cam blocks 74 and will be swung outwardly, thereby disconnecting the rods 58 and associated parts from the platen and allowing them to drop, thus effecting a return of the mold ejecting block 21 to its original position. Springs 77 disposed between the bosses 60 and collars 78 secured to the rods 58 serve to cushion the drop of the rods 58 and associated parts. When the ejecting block has returned to its Figure 1 position in the manner just described, and while the mold previously removed from the mold box is cooling another mold may be positioned in the mold box and another pressing operation may be performed without delay.

To recapitulate the various steps of the herein described method of producing articles from plastic material—first a charge of material is placed in the mold 12, the die 22 is then introduced into the mold and the space between the die and the mold is sealed by means of the ring 39, the die is then partially withdrawn from the mold with the ring 39 still in position on the mold to retain the formed article therein and to thus loosen and strip the article from the die, the ring 39 is then removed from the mold thus unsealing the space, and finally the die is completely withdrawn from the mold. In this manner molded articles such as battery boxes or similar containers may be rapidly produced on a machine requiring a minimum of attention.

We claim:

1. In a molding press, the combination with a mold support having an opening for receiving a mold member; of mold ejecting means mounted for reciprocatory movements relative to said support and slidable through the opening therein; a mold member adapted to be removably positioned in said opening; a platen mounted for reciprocatory movements towards and from said mold support; a second mold member mounted on said platen for cooperation with said first named mold member, said mold ejecting means including a pivoted latch arranged to be engaged by said platen when the latter is moving away from said support to thereby move said ejecting means and eject said first named mold member from the opening in said support; and a cam fixed with relation to said mold support and adapted to be engaged by said latch to thereby swing the latter out of engagement with said platen when the platen has moved a predetermined distance away from said support.

2. In a molding press, the combination with a mold support provided with an opening for receiving a mold member; of an ejecting block slidably mounted within said opening, a mold member removably positioned within said opening; a platen mounted for a reciprocatory movements towards and from said mold support; a second mold member mounted on said platen for cooperation with said first named mold member; a rod connected to said ejecting block and mounted for sliding movements relative to said mold support; and a latch on said rod adapted to be automatically engaged by said platen when the latter moves a predetermined distance away from said mold support to thereby move said ejecting block through the opening in said mold support and to eject said first named mold member therefrom.

3. The combination with a press including a press base, a press head, and strain rods connecting said base and head, and a platen mounted for vertical reciprocatory movements towards and from said base; of a mold box mounted on said base and having a vertically extending opening for receiving a mold member; a mold ejecting block slidably mounted in said opening and normally supported on said base; a mold member removably positioned within said opening; a second mold member mounted on said platen for cooperation with said first named mold member; a rod mounted for vertical sliding movements with respect to the press base and being connected to said ejecting block; a latch pivoted to said rod and adapted to be engaged by said platen when the latter moves a predetermined distance away from said base to thereby move said ejecting block upwardly through the opening in said mold box to eject said first named mold member therefrom; a cam disposed in the path of said latch and adapted upon engagement with the latch to swing the latter out of engagement with said platen to thereby permit said rod and ejecting block to return to their initial positions; and means for cushioning the return of the ejecting block and rod.

4. In a molding press, the combination with a mold support having an opening for receiving a mold; of a mold adapted to be removably positioned in said opening; a platen mounted for reciprocatory movements relative to said support; a die carried by said platen and adapted to enter said mold during a pressing stroke; a yieldable mold sealing device carried by said platen and engageable with said mold; mold ejecting means adapted to be engaged by said platen during a return stroke of the latter for rejecting said mold from the opening in said mold support after said mold sealing device has become disengaged from said mold; and means for disengaging said ejecting means from the platen when the latter has moved a predetermined distance from the mold.

In testimony whereof, we have hereunto subscribed our names.

LESLIE S. HUBBERT.
CARL J. ZUBE.